United States Patent

McGillis

[11] 3,963,041
[45] June 15, 1976

[54] SAFETY SHUTOFF VALVE
[75] Inventor: Hugh D. McGillis, Brockton, Mass.
[73] Assignee: McGillis Engineering, Inc., Brockton, Mass.
[22] Filed: May 1, 1975
[21] Appl. No.: 573,741

Related U.S. Application Data
[63] Continuation-in-part of Ser. No. 446,530, Feb. 27, 1974, abandoned.

[52] U.S. Cl................................. 137/410; 137/404; 137/421; 141/198
[51] Int. Cl.²......................................... F16K 31/18
[58] Field of Search........... 137/390, 400, 401, 403, 137/404, 405, 418, 421, 445, 448, 410; 141/95, 96, 198, 200

[56] References Cited
UNITED STATES PATENTS

| | | | |
|---|---|---|---|
| 1,267,780 | 5/1918 | Lunde | 141/200 |
| 1,462,253 | 7/1923 | Tobiasson | 141/200 |
| 2,299,360 | 10/1942 | Tharp | 137/448 |
| 2,569,110 | 9/1951 | McGillis et al. | 137/448 |
| 3,078,867 | 2/1963 | McGillis et al. | 137/448 |

Primary Examiner—Martin P. Schwadron
Assistant Examiner—George L. Walton
Attorney, Agent, or Firm—Cesari and McKenna

[57] ABSTRACT

A safety shutoff valve for fuel storage tanks and the like includes a housing with a float controlled valve member which closes in response to the rising liquid level in the tank to which the valve is attached. An elongated tubular member is attached to the valve outlet and projects an appreciable distance below the valve member that when the liquid level is high enough to close off the opening in the elongated member, a back pressure is developed within the elongated member and valve housing which causes the valve member to close and seat relatively gently under high pressure fill conditions. Special openings are provided in a baffle over the valve member to allow a portion of the incoming liquid to impinge upon the valve member to help urge it beyond the baffle whereupon it is driven to its closed position by the incoming liquid stream.

4 Claims, 7 Drawing Figures

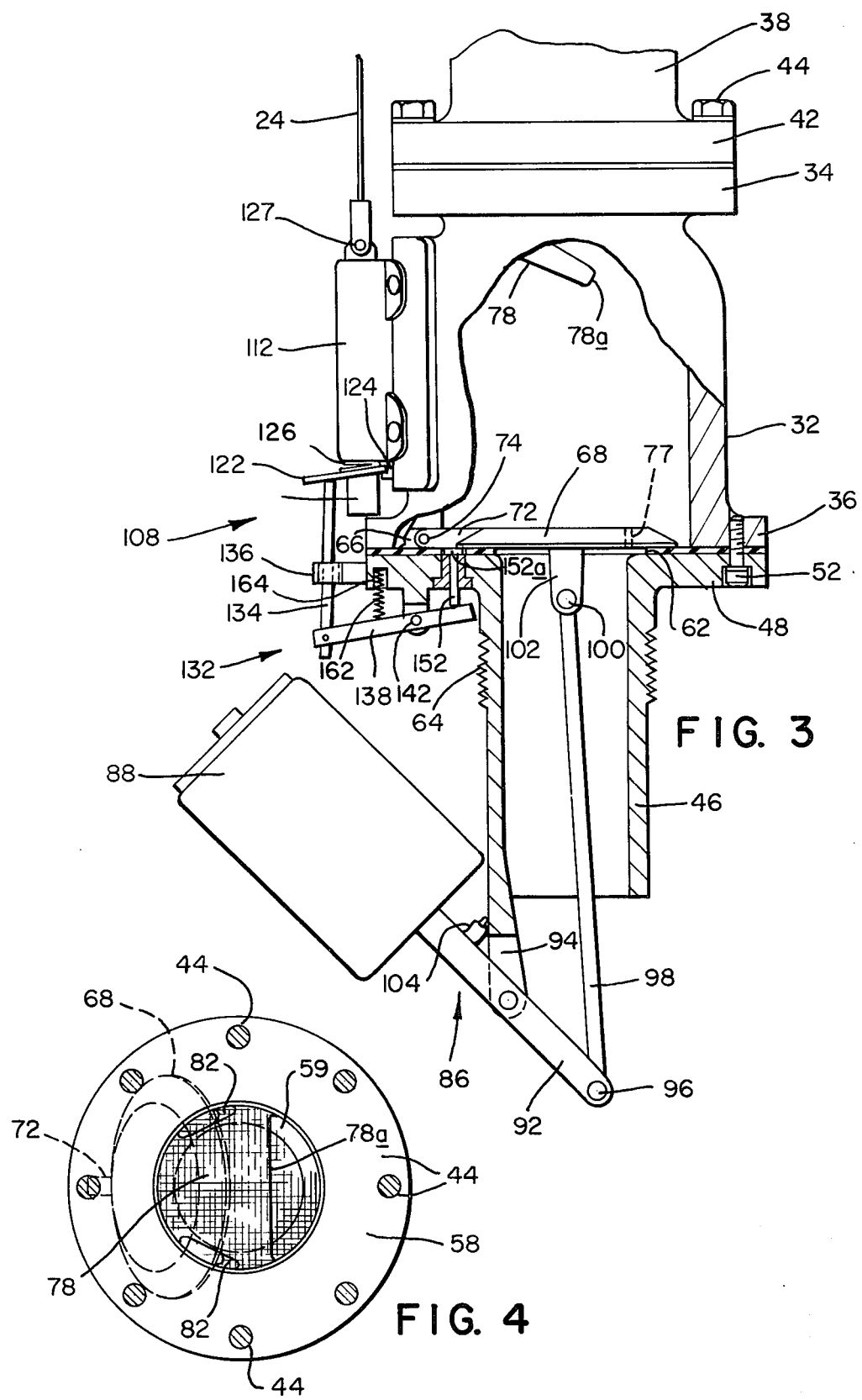

SAFETY SHUTOFF VALVE

RELATED APPLICATION

This application is a continuation-in-part of application Ser. No. 446,530, filed Feb. 27, 1974, now abandoned entitled SAFETY SHUTOFF VALVE.

BACKGROUND OF THE INVENTION

This invention relates to a safety shutoff valve. It relates more particularly to a valve for stopping the delivery of liquid fuel to a fuel tank or a fuel truck when the same are filled to the desired level.

The subject valve has special utility in connection with the refilling of large fuel trucks at a tank farm, under both high and low fuel delivery pressures, and the invention will be described specifically in this context.

Various devices have been proposed for shutting off the flow of fuel into a fuel storage tank when a predetermined liquid level is reached in the tank. One type is shown in U.S. Pat. Nos. 2,464,456 and 2,569,110. This type of valve employs a float which is connected to a valve member. When the liquid level in the tank reaches predetermined height, the float rises and closes the valve member which stops the flow of fuel into the tank. Provision is also made for bleeding fuel from the fill pipe leading to the valve to relieve the pressure in that line prior to uncoupling the pipe from the valve.

While that type of shutoff valve works satisfactorily at relatively low fill pressures, it does not respond quickly enough when the fuel is being injected through the valve into the tank at higher pressures, on the order of 90 psi. Sometimes the valve float does not have time to respond to the rapidly changing liquid level, with the result that the valve does not shut off until after the tank is filled to the brim. This leaves no room to bleed off the fuel remaining in the fill pipe. Consequently, when the pipe is uncoupled from the valve, fuel spurts from the end of the pipe over the tank and onto the ground.

Further, fuel shutoff valves of this type should be more rugged so as to handle the higher fill pressures used today. Specifically, the shutoff and bleed mechanisms must be able to withstand the large forces developed when the valve member is slammed against its seat by the incoming high pressure liquid.

Also, the prior valves include no provision for automatically shutting off the control valve located between the storage tank and the fill pipe. Consequently, if the operator forgets to do this, when be uncouples the fill pipe from the subject inlet valve on the truck, fuel will flow out of the pipe onto the ground until the operator has the presence of mind to shut off that valve located at the storage tank.

As a result of the foregoing, fuel shutoff valves of the above type have not been as widely used as they might be in connection with the high pressure filling of fuel tanks and fuel trucks.

SUMMARY OF THE INVENTION

Accordingly, this invention aims to provide a safety valve for a fuel tank which operates properly with both high and low fuel feed pressures.

Another object of the invention is to provide a shutoff valve which is rugged and reliable.

Still another object of the invention is to provide a shutoff valve for a liquid storage tank which includes provision for bleeding the fill pipe after the tank is almost filled, and the subject valve is shut off.

A further object of the invention is to provide a shutoff valve for a liquid storage or truck tank which automatically shuts off the control valve on the storage tank serving it.

Other objects will in part be obvious and will in part appear hereinafter.

The invention accordingly comprises the features of construction, combination of elements and arrangement of parts, which will be exemplified in the following detailed description, and the scope of the invention will be indicated in the claims.

Briefly, the present valve includes a housing with an inlet and an outlet and a valve seat located between the two. A valve member mounted in the housing is able to swing from a closed position wherein it rests on a valve seat to an open position wherein it is situated under a deflector or baffle disposed between the valve inlet and the valve seat. As long as the valve member remains in its open position under the baffle, it is shielded from the incoming liquid stream. However, when the valve member is swung from under the baffle into the path of the incoming stream, it is driven by the force of that stream to its closed position against the valve seat.

The valve member is connected by suitable linkage to a float mounted on the outside of the valve housing, and the weight of the float normally maintains the valve member in its open position. However, when the fuel level rises to a point near the top of the tank, the liquid buoys up the float which thereupon follows the liquid level and gradually swings the valve member out from under the baffle. During low pressure filling, as soon as the valve member encounters the incoming liquid stream, it is driven to its closed position, shutting off the flow of fuel into the tank. Also, the closing of the valve member raises the float above the liquid level in the tank and suspends it there until the pressure in the fill pipe is relieved by fuel bleeding off via a bleed hole in the valve member.

The operator can expedite drainage of the fuel trapped in that portion of the fill pipe between the control valve and the subject shutoff valve by manually manipulating the aforementioned linkage to urge the pin against the valve member to open that member enough to relieve the pressure in the fill pipe. As soon as the fill pipe pressure is relieved, the upraised float falls to the liquid level in the tank and swings the valve member to its open position so that all of the fuel remaining in the fill pipe flows into the tank.

In some high pressure applications, the float does not respond quickly enough to changing liquid levels in the truck tank to close the valve member at the proper time. To overcome this problem, the housing has a tubular extension or nozzle which projects down into the tank appreciably below the valve seat. During a high pressure filling operation, the incoming fuel stream causes considerable roiling of, and turbulence in, the fuel already in the truck tank. As soon as the liquid level rises above the opening in the nozzle, a back pressure is built up inside the housing and nozzle, causing roiling of the liquid therein. This deflects a portion of the incoming liquid stream under the baffle and behind the valve member. Also, the baffle is provided with openings at points therein located behind the upraised valve member through which a portion of the incoming stream flows. Thus, liquid engaging the valve member from behind tends to urge it toward its closed position. As soon as the valve member swings out beyond the baffle, it encounters the incoming fluid stream as described above and is driven to its closed position.

Even though the incoming stream is under relatively high pressure, on the order of 90 psi, the valve member seats relatively gently because of the aforementioned back pressure developed in the housing and nozzle and because of the roiling liquid inside the housing. Consequently, when the valve closes, the stresses on the valve member, valve seat and associated linkage are kept to a minimum.

The present valve also includes provision for automatically shutting off the quick-closing, toggle-type control valve normally present in the line leading from the fuel supply to the fill pipe. More particularly, a spring-actuated plunger is mounted on the outside of the valve housing. At the beginning of the filling operation, the plunger is connected by a suitable lanyard to the handle of the quick-closing valve on the storage tank. The plunger is normally in its retracted position, but may be extended manually and retained in that position by a latch. The latch is actuated to retract the plunger by a pin which projects into the housing, directly below the valve member, and which is connected by suitable linkage to the latch. When the valve member is swung to its closed position, it moves the pin, thereby actuating the latch. Resultantly, the plunger retracts and pulls the lanyard, thereby closing the quick-acting control valve at the tank.

In use, the truck operator drives his truck to the appropriate storage tank in the tank farm and connects a fill pipe to each of the fill openings in the truck tank, each of which contains one of the subject shutoff valves. In the larger trucks, there may be as many as four such fill openings. As the operator connects the fill pipe to the shutoff valve at each fill opening in the tank, he sets the plunger on each valve in its extended position and opens the control valve for that fill pipe, allowing fuel to flow into the tank. Then he connects the lanyard attached to the valve plunger to the handle of that control valve.

Using four fill pipes under high pressure filling conditions, e.g. 90 psi, as much as 1200 gallons per minute of fuel will flow into the truck. Assuming the truck has a capacity of 10,000 gallons, it will be filled to capacity in approximately 8 minutes.

As the liquid level in the tank reaches the openings in the housing extensions on the four valves, the resultant back pressure and roiling of liquid in the valve housings causes each valve to close. The closing of each shutoff valve automatically turns off the quick-acting control valve in the fill pipe leading to that valve. This high volume, high pressure filling operation thus minimizes the turnaround time of each truck and thus permits a maximum number of trucks to be filled during the day. Also, despite the fact that the truck is being filled at four different locations, the entire filling operation can be handled by a single operator.

After the fill pipes are shut off, the pressure therein is relieved by fuel draining out through the bleed holes in the four valve members. This process can be hastened by the operator manually opening the valve member in each valve. As soon as the pressure has been equalized on both sides of the valve member, the valve float which has been raised above the liquid level in the tank will drop, thereby opening the valve member and draining any liquid in the fill pipe into the tank.

If the truck tank is not quite filled to capacity, the operator can top it off by manually opening the quick-acting control valve in one of the fill pipes until the liquid level in the truck raises the float on the shutoff valve connected to that line to a point where the valve member is swung into the path of the incoming liquid stream and closes. This valve can then be cracked open as noted above to drain fuel from that fill pipe, completing the filling operation.

On the other hand, if the entire filling operation is carried out at a relatively low feed pressure, the flow of liquid into the truck will continue until the floats on the four shutoff valves move their respective valve members beyond the associated baffles, whereupon the valve members are driven to their closed positions by the incoming fluid streams.

After each fill pipe has been drained, as described above, it is uncoupled from the shutoff valve and made ready for connection to the next truck in line. Thus, the filling of very large trucks of this type can be accomplished in a relatively short time by a minimum number of persons, thereby minimizing the operating costs of tank farms and trucks of this type.

BRIEF DESCRIPTION OF THE DRAWINGS

For a fuller understanding of the nature and objects of the invention, reference should be had to the following detailed description taken in connection with the accompanying drawings, in which:

FIG. 3 is a view similar to FIG. 2 showing the valve in its closed position;

FIG. 4 is a view along line 4—4 in FIG. 2;

DESCRIPTION OF THE PREFERRED EMBODIMENT

Figures 1, 2:
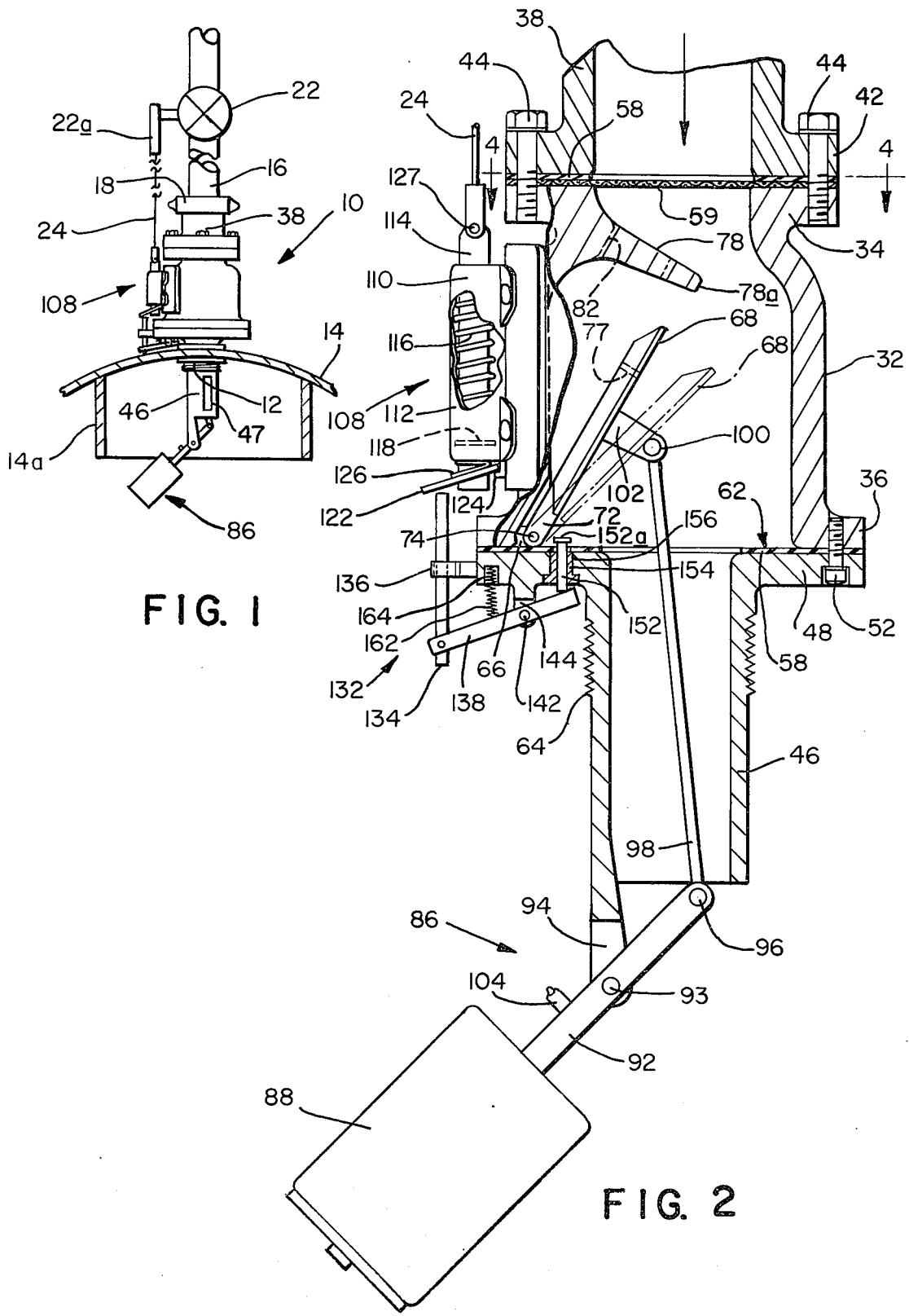
FIG. 1 is a sectional view with parts in elevation showing a shutoff valve made in accordance with this invention installed in a conventional tank.
FIG. 2 is a similar view on a larger scale showing the valve in greater detail, the valve being shown in its open position.

Referring now to FIG. 1 of the drawings, the subject shutoff valve shown generally at 10 is screwed down into a threaded fitting 12 in the top wall of a tank 14. Tank 14 can be carried by a truck chassis or can be stationary, depending upon the particular application. If desired, the tank 15 can be equipped with a relatively large diameter skirt 14a depending from the top wall of the tank around fitting 12. This skirt helps to minimize turbulence within the tank as the liquid level approaches the top of the tank.

A fill pipe 16 leading from a storage tank (not shown) is arranged to be coupled to valve 10 by way of a conventional quick disconnect bayonet fitting 18. The fill pipe 16 is outfitted with a lever-type, quick-acting control valve 22 to stop the flow of fuel from the tank through the fill pipe. When the tank 14 is being filled, shutoff valve 10 is connected by lanyard 24 to the handle 22a of the quick-acting valve 22. From this point on, the filling operation can be unattended. When the tank is nearly filled to capacity, the valve 10 will respond by closing automatically to prevent any additional fuel being fed into the tank. At the same time, the valve 10 will tension lanyard 24 enough to trip the valve handle 22a so that valve 22 also closes.

Thereafter, provision is made for draining any fuel remaining in the fill pipe 16 between valves 22 and 10 so that when fitting 18 is uncoupled from the valve, there will be no appreciable fuel remaining in the fill pipe to spill out onto the truck or ground.

Turning now to FIGS. 2 and 3, the shutoff valve 10 includes a generally cylindrical housing 32. The upper end of the housing is necked-down and carries a flange 34. The lower end of the housing also has a flange 36.

A quick release bayonet fitting 38 (FIGS. 1 and 2) having a flanged lower end 42 is secured to flange 34 by means of bolts 44 extending down through flange 42 and threaded into flange 34. Fitting 38 is designed to couple to fitting 18 (FIG. 1) to provide a tight union between feed pipe 16 and valve 10.

A generally cylindrical aluminum housing or nozzle 46 having a flanged upper end 48 is secured to the lower end of housing 32 coaxially therewith. Specifically, the nozzle flange 48 is secured to housing flange 36 by means of bolts 52 passed through flange 48 and threaded into flange 36. The joints between coupling 38, nozzle 46 and housing 32 are made fluid-tight by suitable annular gaskets 58 positioned between those members. Also, a coarse mesh screen 59 is installed between fitting 38 and housing 32 to screen out debris that might be carried in the fuel flowing from the tank.

Nozzle 46 is approximately the same length as housing 32, but its diameter is only about half that of the housing. Consequently, an annular platform 62 is formed at the bottom of the housing which functions as a valve seat. Also, the outside wall of nozzle 46 is threaded at 64 so that valve 10 can be turned down into the tank fitting 12 as shown in FIG. 1 with nozzle 46 projecting an appreciable distance down into the tank.

Still referring to FIGS. 2 and 3, a small ear 66 projects inwardly from the housing 32 wall near the bottom thereof for pivotally supporting a valve member 68. The valve member is circular and somewhat larger in diameter than the opening through extension 46. The valve member has an arm 72 which projects out laterally and is pivotally connected to ear 66 by way of a pin 74 extending through the end of the arm and the ear. Valve member 68 is swingable about its pivot from an open position wherein it projects upwards and lies fairly close to the inside wall of the housing 32 adjacent pin 74 to a lower position wherein it seats on the valve seat 62. When so seated, the valve member prevents liquid from flowing through the valve 10. However, some liquid flow may occur through a small bleed hole 77 formed in member 68.

As best seen in FIGS. 2 and 4, a deflector or baffle 78 is formed near the top of housing 32 integral with the housing wall. Baffle 78 slopes downwardly from its connection to the housing wall to an extent which places its edge 78a slightly below the necked-down portion of housing 32. The result is that the baffle covers or closes off somewhat more than half of the passage into housing 32.

As best seen in FIGS. 2 and 4, a pair of elongated openings 82 are provided through the baffle 78 at each side thereof at points where the baffle joins the housing 32 wall. These openings permit a minor portion of the fluid entering the valve to pass through the baffle rather than around it.

When the valve member 68 is in its fully open position, it is positioned under baffle 78 and is shielded from the liquid entering the valve. However, when the valve member is moved to the dotted line position shown in FIG. 2, it is no longer shielded from the major part of the incoming liquid stream, with the result that the force of the liquid engaging the valve member drives it to its closed position shown in FIG. 3. The coaction between the deflector 78 and valve member 68 is described in more detail in the aforesaid U.S. Pat. No. 2,569,110.

Referring to FIGS. 2 and 3, valve member 68 is moved between its solid and dotted line positions illustrated in FIG. 2 by means of the float arrangement shown generally at 86. The float arrangement includes a generally cylindrical float member 88 made of cork, styrofoam or other buoyant material. An arm 92 projects out from one end of member 88 and is pivotally connected by a pin 93 to an ear 94 depending from the lower end of nozzle 46. The free end of arm 92 is connected by another pin 96 to one end of a long link 98 whose other end is connected to valve member 68. Specifically, that other end of link 98 is connected by a pin 100 to an ear 102 projecting from the underside of valve member 68.

When the float member 88 is moved to it lowermost position as shown in FIG. 2, it swings the valve member 68 upwards to its fully open solid line position. On the other hand, when the float member is raised to its uppermost position shown in FIG. 3, the valve member 68 is swung to its closed position wherein it seats on the valve seat 62. Of course, when the float member 88 is raised partway between its lowermost and uppermost positions, the valve member 68 is swung to its dotted line position shown in FIG. 2.

A stop member 104 which projects laterally from arm 92 is arranged to engage the wall of nozzle 46 when the float member is in its uppermost position to limit the upward movement of the float member so as to protect the various parts of the float arrangement from undue strain.

The apparatus for tensioning lanyard 24 is shown generally at 108 in FIGS. 2 and 3. It is comprised of a spring-loaded plunger 110 secured to the outside of housing 32 at a point behind the upraised valve member 68. Plunger 110 includes a generally tubular housing 112. A relatively long cylindrical shaft 114 is slidably mounted in the housing with its ends projecting from the ends of the housing. The shaft is biased to its lowermost position in the housing by a spring 116 which is compressed between the upper end of the housing and a collar 118 affixed to the shaft near its lower end. Collar 118 also acts as a stop to limit the downward travel of the shaft.

Shaft 114 can be raised manually in opposition to the spring bias and is maintained in its raised position by a retainer or latch 122 pivotally connected at 124 to housing 110 at the bottom thereof. Retainer 122 is actually an annular member which engages around the bottom end of shaft 114. The retainer can cock about its pivot 124, but it is biased to its lowermost position shown in FIG. 2 by a spring 126 acting between the retainer and the housing 110. When the retainer is cocked as illustrated, its inner edge grips opposite sides of a shaft 114 and prevents the shaft from moving downwards. However, when the retainer 122 is tilted upwardly about its pivot 124, the shaft is free to move downwards through the opening in the retainer. The lanyard 24 is removably connected to the upper end of shaft 114 by a pin 127.

Still referring to FIG. 2, retainer 122 is lifted to release the shaft by a trigger mechanism shown generally at 132. This trigger consists of a pin 134 slidably mounted in a bracket 136 projecting out from the side of flange 48. The pin is positioned directly below the retainer 122 so that when the pin is slid upwards in its bracket, it lifts the retainer and releases the shaft. The lower end of the pin 134 is connected to one end of a lever arm 138 which is, in turn, pivotally connected midway along its length by a pin 142 to an ear 144 depending from flange 48. The other end of lever 138 is engaged by a pin 152 slidably mounted in a bushing 154 screwed into an opening 156 in flange 48.

The upper end of the pin, which is inside housing 32, has a flat head 152a positioned directly below the arm 72 on valve member 68. When the valve member is swung to its closed position shown in FIG. 3, the arm 72 presses down on pin 152, thereby swinging the lever arm 138 so that it raises pin 134 and releases the plunger shaft 114. A spring 162, one of whose ends is retained in a recess 164 in the underside of flange 48, reacts against the lever 138 on the pin 134 side of its pivot at 142 so that the pin 134 is normally biased downward away from retainer 122.

In some cases, it is desirable to provide a side opening in nozzle 46 as shown at 47 in FIG. 1. This prevents the above-described back pressure buildup within the valve until the liquid level reaches the very top of the tank.

Figure 6:
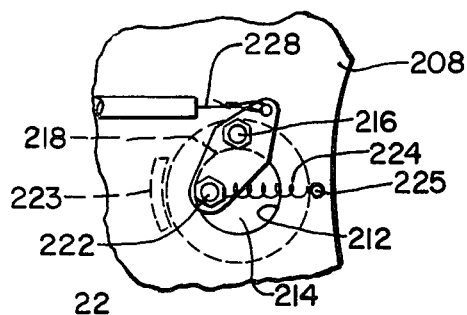
FIG. 6 is a sectional view along line 6—6 in FIG. 5.
Figure 5:
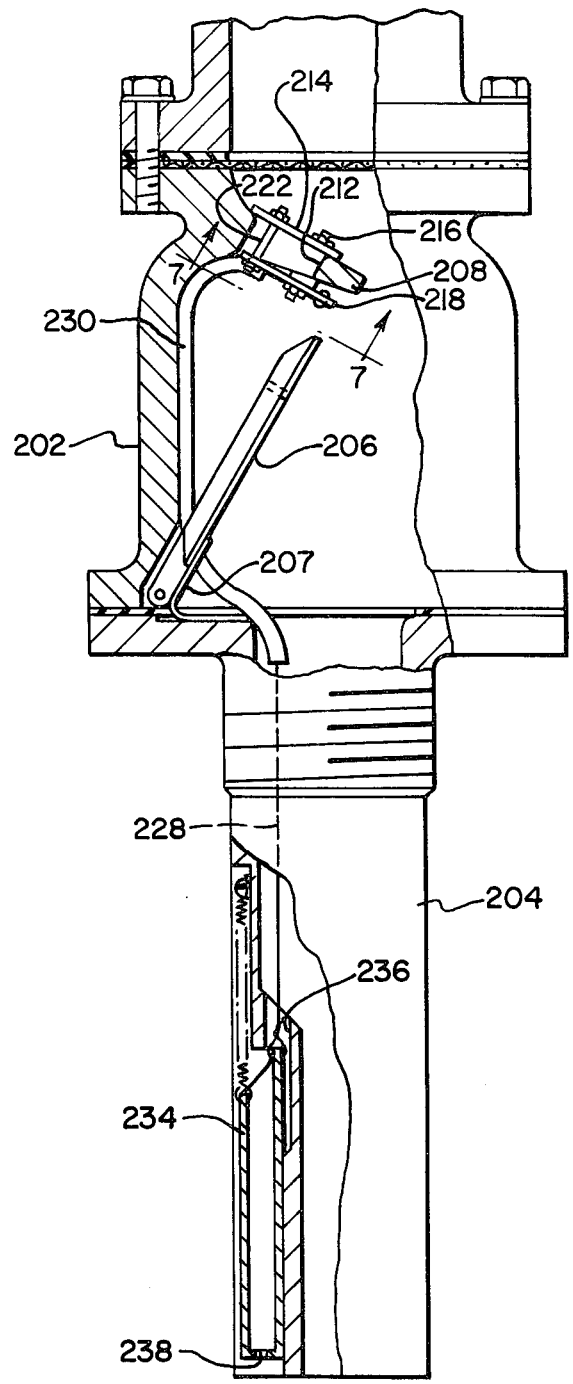
FIG. 5 is a view similar to FIG. 2 of another valve embodiment.

Referring now to FIGS. 5 and 6 of the drawings, illustrated there is a safety shutoff valve which is especially compact and easy to install in most conventional tanks. That valve has a housing 202 and nozzle 204 which are very similar to the corresponding elements 32 and 46 in the FIG. 2 valve. A valve member 206 similar to member 68 is pivotally mounted in the housing and swingable between an open position in which it underlies a deflector or baffle 208 and a closed position wherein the valve member 206 rests against a valve seat at the top of nozzle 204.

Instead of the valve member 206 being opened and closed by a float member as in the FIG. 2 valve embodiment, the valve member is suitably biased toward its open position such as by a spring 207 mounted at the member 206 pivot point or other equivalent means.

Referring particularly to FIGS. 5 and 6, the deflector 208 has a single relatively large opening 212 through it. A cover plate 214 connected by a pivot 216 to baffle 208 is swingable between a closed position in which it completely covers the opening and an open position wherein it allows fluid to flow through opening 212. A lever arm 218 is connected by the pivot 216 at the underside of baffle 208. Lever arm 218 is also connected to cover 214 by a pin 222 extending through passage 212. Also, cover 214 is normally maintained in its closed position against a stop 223 (FIG. 6) by means of a spring 224 compressed between pin 222 and a pin 225 at the side of opening 212.

As best seen in FIGS. 5 and 6, a wire 228 is connected at one end to lever arm 218 and extends through a passage 230 through the side wall of housing 202 and the side wall of nozzle 204. The opposite end of wire 228 is connected to the top of an open-topped bucket or container 234 slidably mounted in a channel 236 formed in the side wall of nozzle 204.

The spring constant of spring 224 is such that when the bucket 234 is empty, the bucket is maintained in its upper position in channel 236, cover 214 then being closed. However, when the liquid level in the tank 14 (FIG. 1) rises above the open upper end of the bucket, the bucket fills with oil and drops to its lower position in channel 236. The weight of the bucket and its contents is sufficient to offset the bias of spring 224 whereupon the cover 214 swings to its open position. At this point, a portion of the oil which is normally deflected away from valve member 206 by the baffle 208 is free to flow through the baffle opening 212. The oil engages behind the valve member 206 and drives the member quickly to its closed position, thereby shutting off the flow of oil into the tank 14 (FIG. 1).

After the operator shuts off the valve 22 (FIG. 1), the oil in housing 202 will bleed out through the bleed hole in the valve member as described above in connection with FIG. 2. As soon as the pressure in the housing is relieved, the spring 207 will swing the valve member 206 to its open position so that all the oil will drain from housing 202. Also, eventually, the oil will drain from the bucket 234 through a bleed hole 238 in the bottom of the bucket, at which point the spring 226 will swing cover 214 to its closed position and lift the bucket 234 to its upper position in channel 236.

This valve embodiment has the advantage of being compact so that it can be dropped straight down into a standard tank opening. Also, the valve closes due to the positive action of the falling bucket 234 opening cover 214, thereby allowing the incoming oil to drive the valve member 206 to its closed position.

Figure 7:
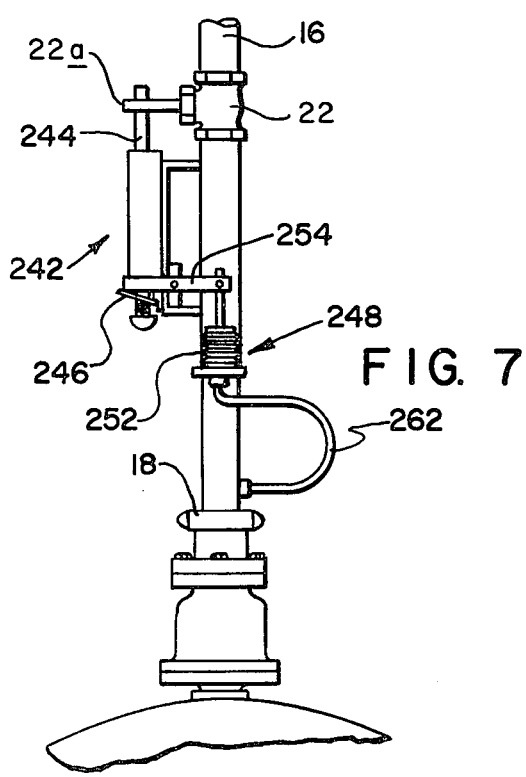
FIG. 7 is a diagrammatic view of a modified fill pipe closure mechanism.

Turning now to FIG. 7, if the valve 22 in the fill pipe 16 is the type employing a long arm which is swung up in order to open the valve 22 and which is normally biased to its valve closed position, it is desirable to use a slightly different valve 22 closure mechanism.

More particularly, a valve 22 handle locking mechanism 242 is mounted on the fill pipe 16 adjacent the handle. Mechanism 242 is much the same as the spring-loaded plunger 110 illustrated in FIG. 2. It has a shaft 244, one end of which projects toward the valve handle 22a and whose other end projects from the opposite end of the plunger 242 terminating in a rounded knob.

After the operator has swung up the valve handle 22a, thereby opening the valve, he pushes against the knob end of the shaft 244 until the opposite end of the shaft projects under handle 22a, preventing it from returning to its valve closed position. The shaft 244 is maintained in this extended position by means of a latch 246 which is identical to the latch 122 in FIG. 2 and functions in the same way.

Positioned directly adjacent the plunger 242 is a pressure-responsive device 248 consisting of a bellows or diaphragm 252 with a pivotally mounted actuating arm 254. When the bellows 252 is extended, the arm 254 is pivoted so as to engage against and cock and latch 246 sufficiently to release shaft 244. Thereupon, the shaft retracts from under the handle 22a, allowing it to assume its valve-closed position. A fluid line 262 is connected between the bellows 252 and an opening through the side of the fill pipe 16 upstream from the bayonet connection 18.

When the valve member 68 or 206 swings closed after the tank 14 is filled, the pressure in the valve housing 32 or 202 and in the upstream conduit 16 increases appreciably, thereby sending a pressure pulse to the bellows 252, causing it to extend. The extension of the bellows releases shaft 244 in the plunger mechanism 242, causing the shaft 244 to retract, thereby releasing the valve handle 22a. After the pressure in the fill pipe is reduced by oil bleeding through the bleed hole in the valve member, the operator can disconnect the fitting 18 without spillage as described above.

The next fill operation is commenced by connecting the fitting 18 to a new tank, lifting the valve handle 22a and extending the plunger mechanism shaft 244 under the handle, thereby locking the handle in its open position.

It will be seen from the foregoing then that the present shutoff valve can expedite the filling of large tanks under both high and low pressure filling conditions. When installed on the fill inlets of a tank truck, the valve permits the filling operation to proceed unattended because the valve shuts off automatically when the tank is filled and automatically shuts off and bleeds the fill pipes so that when the pipes are uncoupled from the truck, there is no fuel spillage.

Furthermore, the described valve is rugged and reliable so that it can readily withstand the stresses encountered during high pressure filling conditions so that it should have a long life with low maintenance.

It will thus be seen that the objects set forth above, among those made apparent by the preceding description, are efficiently attained and, since certain changes may be made in the above construction without departing from the scope of the invention, it is intended that all matter contained in the above description, or shown in the accompanying drawing, be interpreted as illustrative and not in a limiting sense.

It is also to be understood that the following claims are intended to cover all of the generic and specific features of the invention herein described.

I claim:

1. A safety shutoff valve of the type having a housing with an inlet and an outlet, a baffle inside the housing partially closing the passageway between said inlet and outlet, a valve member inside the housing swingable from an open position wherein it underlies the baffle and a closed position wherein it closes the passage between said inlet and outlet, the improvement comprising
    A. means for biasing the valve member toward its open position,
    B. an opening through the baffle,
    C. a door mounted in the housing and movable between a closed position wherein it closes the opening through the baffle and an open position wherein it permits liquid to flow through the opening,
    D. means for biasing the door to its closed position,
    E. a movable member mounted on the housing and movable between first and second positions in response to the level of liquid relative to the housing, and
    F. means linking the door and the movable member so that when the movable member is in its first position, the door is closed and when the movable member is in its second position, the door is open so that incoming liquid flows through said opening and engages behind the valve member, driving it to its closed position.

2. The valve defined in claim 1 and further including
    A. a retractable member,
    B. means for biasing the retractable member to its retracted position,
    C. means for retaining the retractable member in its extended position,
    D. pressure-responsive means for controlling the retaining means, said pressure-responsive means being in fluid communication with the inside of said housing so that when the fluid pressure increases in the housing upon the closing of said valve member, the pressure-responsive means controls the retaining means so as to release the retractable member which thereupon shuts off the flow of liquid to the valve.

3. The valve defined in claim 1 wherein the movable member comprises a container vertically slidably mounted on the housing, said container moving to its said second position upon being filled with liquid around the housing.

4. The valve defined in claim 3 and further including a bleed hole in the bottom of said container for draining off liquid in the container so that the container can assume its said first position.

* * * * *